(12) United States Patent
Golan et al.

(10) Patent No.: US 12,176,727 B2
(45) Date of Patent: Dec. 24, 2024

(54) WIRELESS POWER TRANSMISSION SYSTEM WITH ADAPTIVE DYNAMIC SAFETY MANAGEMENT

(71) Applicant: Wi-Charge Ltd., Rehovot (IL)

(72) Inventors: Lior Golan, Ramat Gan (IL); Yoav Biderman, Tel Aviv (IL); Ran Sagi, Tel Aviv (IL); Ortal Alpert, Ness Ziona (IL); Ori Refael Mor, Tel Aviv (IL)

(73) Assignee: Wi-Charge Ltd., Rehovot (IL)

( * ) Notice: Subject to any disclaimer, the term of this patent is extended or adjusted under 35 U.S.C. 154(b) by 86 days.

(21) Appl. No.: 17/773,147

(22) PCT Filed: Nov. 1, 2020

(86) PCT No.: PCT/IB2020/060254
§ 371 (c)(1),
(2) Date: Apr. 29, 2022

(87) PCT Pub. No.: WO2021/084517
PCT Pub. Date: May 6, 2021

(65) Prior Publication Data
US 2022/0368166 A1    Nov. 17, 2022

Related U.S. Application Data

(60) Provisional application No. 62/928,564, filed on Oct. 31, 2019.

(51) Int. Cl.
*H02J 50/30*      (2016.01)
*H02J 50/60*      (2016.01)
(Continued)

(52) U.S. Cl.
CPC .............. *H02J 50/30* (2016.02); *H02J 50/60* (2016.02); *H02J 50/80* (2016.02); *H04B 10/807* (2013.01)

(58) Field of Classification Search
CPC . H02J 50/30; H02J 50/60; H02J 50/80; H04B 10/807
See application file for complete search history.

(56) References Cited

U.S. PATENT DOCUMENTS 8,873,061 B1 * 10/2014 Wells ...................... G01N 21/39
356/437
9,673,908 B2    6/2017 Marpaung
(Continued)

FOREIGN PATENT DOCUMENTS

WO       2015144389 A1    10/2015

OTHER PUBLICATIONS

International Search Report and Written Opinion for PCT Appl. No. PCT/IB2020/060254 mail date Mar. 2, 2021, 12 pages.
(Continued)

*Primary Examiner* — Daniel Kessie
*Assistant Examiner* — Brian K Baxter
(74) *Attorney, Agent, or Firm* — Maine Cernota & Curran

(57) ABSTRACT

Methods and systems for safely and effectively supplying a beam of wireless power from a transmitter to at least one receiver. A delta signal is generated by repeatedly calculating the difference in power between the power of the beam emitted by the transmitter and the amount of power received at the receiver. The system dynamically generates a time delay, which is a time period shorter than the maximal exposure duration relating to safe exposure durations for the power level of the delta signal. If the time delay is exceeded, the system changes an operational parameter of the system, such as terminating the beam. Because of limitations to building a perfect timing system, the system is built to be more sensitive to time delays having longer safe exposure durations, with large delta signals having short safe exposure (Continued)

durations being responded to immediately and without significant regard to the time delay.

22 Claims, 8 Drawing Sheets

(51) Int. Cl.
*H02J 50/80* (2016.01)
*H04B 10/80* (2013.01)

(56) References Cited

U.S. PATENT DOCUMENTS

| | | | |
|---|---|---|---|
| 2003/0075670 A1* | 4/2003 | Tuominen | H04B 10/807 |
| | | | 250/205 |
| 2004/0228057 A1 | 11/2004 | Mayama | |
| 2007/0019693 A1 | 1/2007 | Graham | |
| 2014/0091968 A1 | 4/2014 | Harel | |
| 2016/0049831 A1* | 2/2016 | Nakano | G01R 29/0878 |
| | | | 307/104 |
| 2017/0346347 A1 | 11/2017 | Abiri | |
| 2022/0224165 A1* | 7/2022 | Nugent, Jr. | H02J 50/402 |
| 2023/0296803 A1* | 9/2023 | Kare | G01S 17/87 |
| | | | 250/216 |

OTHER PUBLICATIONS

International Preliminary Report on Patentability for PCT Appl. No. PCT/IB2020/060254 mail date May 12, 2022, 8 pages.
Extended European Search Report for Application No. 20882329.4 mail date Dec. 14, 2023, 10 pages.
Anonymous: "Code of Federal Regulations, Title 21, Food and Drugs", Apr. 1, 2018, pp. 791-808, XP093108379.

\* cited by examiner

WIRELESS POWER TRANSMISSION SYSTEM WITH ADAPTIVE DYNAMIC SAFETY MANAGEMENT

RELATED APPLICATIONS

This application is a national phase application filed under 35 USC § 371 of PCT Application No. PCT/IB2020/060254 with an International filing date of Nov. 1, 2020, which claims priority of US provisional patent 62/928,564, with a filing date of Oct. 31, 2019. Each of these applications is herein incorporated by reference in its entirety for all purposes.

FIELD OF THE INVENTION

The present disclosure relates to the field of safety systems in wireless power transmission systems, and more specifically, to the prevention of beam-generated damage arising from the transmission of a power beam emitted by a transmitter device.

BACKGROUND

There are many wireless power systems suggested in the art. However, such systems do not yet appear to have matured to a level that enables them to become commercially available in that they are able to transmit enough power, in accordance with safety regulations, over a reasonable distance for an office or domestic environment, to operate portable electronic devices, such as smartphones and laptops. Such devices require significant charging power, running to over 10 W in many cases.

The need for wireless power transmission systems is generally accepted as a long-existing need, perhaps since the pioneering work of Nikola Tesla at the beginning of the twentieth century. Some such proposed wireless power systems are based on transmitting electromagnetic beams to photovoltaic cells or to antennae on a receiver, others are based on transmitting an ultrasound beam, or other types of power beams to the receivers.

Such suggested transmitting devices are referred to in this disclosure as "transmitters" and may use a laser beam, or another high-energy beam, to supply receivers with power. The "receivers" referred to in this disclosure typically refer to electronic devices remote from the transmitting devices, equipped with a photovoltaic cell to convert the beam received by the transmitter to usable energy, to enable charging of their battery or power their electronic circuits without the need to plug the device into a physical socket. In such systems, the transmitter may identify the receiver by receiving from it, a retro-reflection of the transmitted beam, and/or receiving a wireless communication from it. Typically, a room where it is expected that receivers need charging will be found, is scanned using either the laser beam emitted by the transmitter on a low power setting, or a separate RF or ultrasound beam, or some other means such as a camera. Once a transmitter has located a receiver, the transmitter may use a scanning mirror to direct its full beam towards the identified receiver for charging.

Typically, the beam power emitted by the transmitter is only allowed to impinge on a human, or other sensitive objects or equipment, for an extremely short period of time or at a very low power setting. Such limits have been set by government regulation, such as the current US regulations CFR 21~4040, and other similar accepted regulations. In regular use, such impingement on a human or on other sensitive objects or equipment, can only occur if the power beam is incorrectly directed or if an intrusion of the beam by the human or other object has taken place. In either case, there will be a difference between the power transmitted and the power received by the receiver. Therefore, such systems must be able to verify that most of the power of the beam emitted by the transmitter is absorbed by the receiver, and be able to respond rapidly should this situation change, such as if an object is placed in the beam's path.

Some prior art systems have a number of problems, which may imply an unacceptable safety hazard for certain situations. Even in systems where the location of receivers is known to the transmitter, the beam may be absorbed or reflected by objects in the path between the transmitter and receiver, especially if the receiver is located within an optically complex environment, such as the domestic environment. Any portion of the beam getting "lost" in the path between and the receiver may present a hazard, since many objects are sensitive to laser beam damage. For example, should a transparent object, such as a window, be in the path between a transmitter and receiver, it may reflect a portion of the beam passing through it, towards unknown directions. This situation could occur, should the transmitter be powering a receiver through the transparent window. The window may not be able to handle such a large power level, and may therefore be damaged, or may even break. Furthermore, the transparent surface may transmit some of the beam through it, onto an unintended object. The transmitter may also mistakenly direct a beam at a flammable object, increasing the risk of fire-related damage.

Furthermore, in systems where multiple transmitters are used, a reflected beam may intersect a beam emitted by a different transmitter, even in systems where direct intersection would be prevented. This may have unintended and even dangerous consequences, as the power at the intersection point may be more powerful than safety requirements allow. Furthermore, should a beam mistakenly be directed onto an unintended surface, the surface may reflect the beam, causing the beam to be directed into unwanted directions around the room. Alternatively, a surface may split the beam into random directions, which may expose sensitive objects or equipment to the beam. Thus, any surface, whether fully reflective or only partially reflective, or absorbent materials, such as mirrors, humans, animals, cameras, glass surfaces, metallic surface and sensitive equipment, among other examples, could present a hazardous situation should a beam be mistakenly directed onto them.

Furthermore, typically, the beam profile may change as the beam propagates, and so the beam diameter, optical quality, angular subtense and other parameters may change, making it difficult to determine the permissible duration of exposure for that power, since the permitted exposure may be a function of the power density of the beam. Beam profile and diameter changes are often a function of the detection range, and the wavelength of the beam may change with laser temperature. Thus, prior art systems needed to compare the power loss over durations of time taking into account changing values for every detection range and other lasing parameters.

In International Patent Applications WO 2017/158605, for "System for Optical Wireless Power Supply" and in WO 2017/179051 for "System for Optical Wireless Power Supply" and in WO/2019/064305 for "Fail-safe Optical Wireless Power Supply", all commonly owned and having co-inventors with the present application, there are described various system features and methods for implementing safe operation of such optical wireless power transmission systems for use with single or multiple receivers. Other publications also consider various aspects of safe operation of such systems. However, the prior art does not directly consider exact methodology by which the safety procedures interface with the quantitative requirements of the various safety regulations, and how to efficiently implement compliance of the systems therewith.

There therefore exists a need for systems and methods that overcome at least some of the disadvantages of currently available power transmission systems, and in particular, enable reduction to a minimum, the risk of lasing towards sensitive objects or in forbidden areas, without unduly limiting the intended use of the system, thus providing efficient and undisturbed transmission of power.

The disclosures of each of the publications mentioned in this section and in other sections of the specification are hereby incorporated by reference, each in its entirety.

SUMMARY

A system is disclosed for safely and effectively supplying a beam of wireless power from a transmitter to at least one receiver. The difference in power between the power of the beam emitted by the transmitter and the amount of power received at the receiver is calculated, and is assumed to be power diverted during its passage from the transmitter to the receiver, and which therefore represents a safety threat to persons or animals or objects in the path of the diverted beam portion. The control system is designed to respond accurately to a large range of lost power signals, both to indications which suggest that a small amount of power is being lost during wireless power supply to a receiver, and to large levels of beam loss, the latter indicating an obstruction between the transmitter and receiver device. The system is adapted to provide reliable protection despite the large range of levels of power losses which may arise between a transmitter device and receiver device.

In order to calculate the amount of power being lost between the transmitter and the receiver device, the level of power emitted by the transmitter is measured, typically by a power meter, and the level of power received at the receiver device is similarly measured, using a receiver power measurement, or any of the systems or methods described hereinbelow. A signal which represents the difference between these two power levels is calculated, and may henceforth be referred to as the $\Delta$ signal, or lost-power signal.

The major problem that has to be solved is related to the regulatory limits of power exposure allowed in such systems, as a function of the exposure time regarded as being safe. Thus, a very high level of stray power can only be permitted if the exposure time to that power level is very short, before the safety mechanism in the system should terminate the exposure. On the other hand, a very low level of exposure can be allowed for very long periods, even for hours or days for sufficiently low power levels, before the safety mechanism in the system should terminate the exposure.

In a typical, real-life scenario, even with a supposed constant power, the $\Delta$ signal does not show a constant level, since besides the generally steady delivery of power from transmitter to receiver, noise interference or transient and non-dangerous beam obstructions may cause the $\Delta$ signal to rise and fall. When these temporary noise-like changes in the $\Delta$ signal are received by the system, the system may conclude that the change in the $\Delta$ signal is indicative of a situation in which the beam emitted by the transmitter is impinging on a surface other than the receiver cell, and thus be causing beam-generated damage either to whatever it is impinging upon, or on an object in the path of the beam reflected from that untargeted surface. The correct response should therefore be to terminate the beam, or to otherwise quash the rise in the $\Delta$ power reading. On the other hand, if the increased $\Delta$ has arisen from such a noise phenomenon, although these changes in power loss may appear to the system to be significant, the $\Delta$ signal may return to an acceptably low level within a short period of time, and if that short period of time were less than the permitted exposure time to that power level, this would not necessitate the system to terminate lasing, or to modify any transmission parameters otherwise, to reduce the $\Delta$ signal. Guidelines disclosed in this application stipulate the maximal time exposure permissible as a function of the level of power lost between the transmitter and receiver.

One feature of the currently disclosed systems and methods is the determination of a "waiting period", or delay time (referred to as $T_{delay}$ hereinbelow), which is dynamically set according to the level of the $\Delta$ signal. This waiting period is the time during which the system delays responding to the loss of power indicated by the $\Delta$ signal, to avoid premature shutting down of the system, where this may not be mandated. $T_{delay}$ must be equal to or less than the maximal permissible duration of the power loss measured in the $\Delta$ signal, as indicated in regulations. The delay time may also be a dynamic function of power emitted from the transmitter, in addition to the difference as indicated by the $\Delta$ signal.

An "event clock", otherwise referred to as a timing system, is typically used to monitor the $T_{delay}$, such that the "event clock", acts as a timer system to ensure that $T_{delay}$ is not exceeded. The "event clock" typically includes an amplification system, or a frequency selective signal processor, and typically receives the $\Delta$ signal as its input signal. Alternatively, the input signal may be the signal outputted by the receiver power meter, thus a large output signal would be indicative of at least a large portion of the beam reaching the receiver.

In situations where the $\Delta$ signal changes, whether reduced or increased, and thus $T_{delay}$ needs to be recalculated, the "event clock" is re-set with a new $T_{delay}$. The new $T_{delay}$ may be calculated as a function of the difference power accumulated in any of the immediately previous $T_{delay}$ periods, calculated over a wireless transmission event, since some objects may have remained in the beam's path despite other transient changes A non-limiting example is a case wherein a first partially transparent object is placed in the beam's path, and a second partially transparent object is then additionally placed in the beam's path. In this case, the system must calculate a new $T_{delay}$ to match the new amount of power lost between the transmitter and receiver. However, the system may have to factor into this new $T_{delay}$ the amount of power the first partially transparent object has accumulated prior to the placement of the second partially transparent object.

An ambient level for the $\Delta$ signal is typically chosen to reflect a clear beam path between the transmitter and the receiver, having no significant obstructions which would block and thus prevent a satisfactory portion of the beam from impinging upon the receiver device. If the $\Delta$ signal drops to the ambient level, the $T_{delay}$ may be calculated without taking into consideration previous power loss, since this may be indicative of no significant beam obstructions which may need to be taken to account for beam exposure duration. To illustrate this, if an object is removed from the beam's path, causing the Δ signal to drop to the ambient level, and the Δ signal remains at or below the ambient level for some time, the system may conclude that any beam power accumulated on that object is no longer significant, since that object has been out of the beam path for a significant amount of time and thus even if it were to be re-inserted, a new delay time should be commenced.

However, if the Δ signal drops to the ambient level for less than a pre-determined or calculated time, the $T_{delay}$ should not be re-set as this is indicative of an object re-entering the beam path, and therefore accumulated laser damage may occur. To illustrate this, if an object is inserted into the beam's path for some time, removed, and then re-inserted, the $T_{delay}$ may be a function of the overall exposure of the object to the beam, due to the insignificant interval in which the object was not present in the beam's path, and thus, the object may suffer accumulated damage should the total exposure time of the object to the transmitter's beam not be taken into account. This is in contrast to a situation where a new $T_{delay}$ is calculated when the object is re-inserted, Due to limitations in engineering a perfect system, meaning a system which can both monitor slow, weak Δ signals, and at the same time, respond to very fast changes in the Δ signal, the current system is configured so that the range of frequencies which the frequency selective signal processor or amplification system, can optimally amplify or monitor, is biased towards monitoring and amplifying the low level Δ signals, which change only over a long period of time, provided that no unexpected even occurs which causes the Δ signal to jump suddenly. Thus, events having a long waiting period, or $T_{delay}$, showing a low loss of power between transmitter and receiver, and therefore need monitoring for very slow changes, are amplified with more gain than signals occurring at high frequencies, which is the requirement of high level Δ signals. Such a configuration provides the system with significant advantages in efficient management of the safety decisions related to stray beam exposure.

Furthermore, in another implementation of the currently disclosed system, a saturation level may be chosen, such that should the delta signal show a loss of power above the saturation level, the event clock may be bypassed, or alternatively, may need to modify the timing system so quickly that the event clock becomes essentially irrelevant, and the control system may terminate lasing or modify a different operational parameter of the system, without any delay whatsoever, by foregoing the need to calculate a new $T_{delay}$ for the new, significant delta signal. This is because delta signals above the saturation level may be considered to be so potentially dangerous that they mandate response times that makes use of an event clock irrelevant, since the maximal exposure duration for these power losses is extremely short. Thus the calculated $T_{delay}$'s would be negligibly short and therefore indistinguishably different from each other. The frequency response of the amplification system associated with the event clock may therefore be configured to have its passband shifted to a lower frequency, providing meaningful amplification at lower signal frequencies, since frequencies associated with powers above the saturation level signals need to be responded to, essentially without requiring the timing operation of the event clock. This adjustment of the normally expected frequency response of the amplifier or processor allows the system to cover the large dynamic range required.

Calculations may be done using digital electronics, but also using analog electronics or even other physical processes. Analog amplifiers can integrate, sum, window-sum, and express delays. Other components such as capacitors, inductors, and other electronic components may also be used to perform parts or all of the calculations, in combination with, or even without the need for digital electronics.

Each Δ signal has its allowed exposure time which $T_{delay}$ is set to reflect. If the Δ changes, the event clock, or amplification system, needs to re-set to the new waiting time, in order to keep adjusting to the maximal waiting time permitted for the power losses currently shown by the Δ signal, before the power beam must be curtailed. The event clock, or timer may not have a fast enough response time to signals that change very quickly, and thus quick, yet potentially significant changes in the signal may appear late in the output signal of the amplifier, and hence not reset the clock quickly enough. However, should there be a dramatic increase in the Δ signal, despite the system's inability to meaningfully keep time of the short delay allowed, meaning lack of ability to amplify a signal mandating such a high frequency response quickly enough, the large power level of the Δ signal is sufficient for the controller to respond, despite the low amplification at those high frequencies, enabling the controller to respond sufficiently quickly to instigate the safety shut down before the allowed exposure time has been reached.

A further feature of the presently described systems is related to the methods of how to handle extraneous noise or anomalies in the signal. In order to disregard such extraneous noise or anomalies in the signal, such as changes occurring so quickly that the system recognizes them as noise, and need not respond to them, the system may generate an average of the signal received over a variable time period rather than having to decide whether to respond in real-time. An averaging calculation may be used to determine whether a change in signal is so brief that it can be ignored, or whether the Δ signal has indeed changed significantly, and thus the event clock needs to be re-set to reflect the new $T_{delay}$ mandated by the new Δ signal. This allows for changes occurring over a significantly short time period to be ignored.

It is to be understood that a significant change in the Δ signal may be a dynamic value that is proportional to the Δ signal itself. This means that if a large portion of power is being lost, then small changes in the Δ signal may not need to cause a new time period to be calculated, as contrasted to the situation in which the Δ signal indicates very small power losses, in which case, a small change may be more significant and thus cause a new time period to be generated by the event clock or the frequency selective processor.

According to an alternative procedure, a predetermined value of Δ may be used, such that if the Δ signal changes by that predetermined value, a new time period is always generated.

$T_{delay}$ is thus dynamically calculated, at a high repetition rate, and takes into account the real-time changes in the delta signal. The $T_{delay}$ value at any point in time is a function of the value of the delta signal measured at different recent points in time. For example, the $T_{delay}$ at time T is generally a function of the delta signals at T, and then successively at times $T_n$, to ensure the continuous monitoring of the transmission safety in the most efficient manner.

The timer, or amplification system, has to be configured to meaningfully keep track of signals having low amplitudes, since the waiting or delay time of the timer should be long enough for the amplification system or timer, to meaningfully be able to track and respond to. This delay time or waiting period is necessary in order to allow the system to ignore false positive alarms from noise spikes, and therefore allows the system to avoid turning the laser on and off continually and erroneously.

On the other hand, should a large Δ be indicated, the permitted exposure time to such a large loss of power is very small. Therefore, should it be indicated that a large amount of the beam is unaccounted for, the system may have to react very quickly, in accordance with regulations. The system must re-set the timer or the event clock, to the maximum permitted duration for this large loss of power, and there may be a very short time period before the delay time is reached and passed. Therefore, the system must determine very quickly whether the large Δ was acquired by a brief anomaly from noise or a butterfly flying through the beam path, or the like, or whether there indeed is an incursion into the beam path which represents a danger.

It is difficult to build a hazard prevention system that responds to the large signal dynamic range fast enough and yet has such a large bandwidth of operation. On the one hand, the required signal dynamic range is very large, since the system must keep monitoring very low power signals while at the same time, not being saturated by very high power signals. In addition to this large dynamic range, the system also has to have a large response bandwidth, so that it maintains its ability to monitor very low level signals over long periods of time, while not losing its ability to respond very rapidly should a high level signal occur. Such a system would be sensitive to noise when low signals are detected, and limited by bandwidth and phase delays when a fast response is needed.

According to implementations of exemplary systems described in this disclosure, which fulfil the above mentioned requirements, there is described hazard prevention systems comprising a power meter in the transmitter, measuring the laser output power by the transmitter, a power meter in the receiver, measuring the input laser power to the receiver, a control unit, receiving both signals from both power meters and a power reduction switch, which typically turns off or redirects the beam to prevent a hazard, should the difference between the power emitted from the transmitter and the power received by the receiver exceed a threshold.

The hazard prevention system may have the following properties:
  The system is configured to overestimate the power emitted by the transmitter, at least in most situations, thereby ensuring that errors and noise are accounted for by favoring a safety approach.
  The system is configured to underestimate the power received by the receiver, at least in most situations, thereby ensuring that errors and noise are accounted for by favoring a safety approach.
  The system has a transfer function between the occurrence of the actual difference between power emitted from the transmitter and power received by the receiver and the actual response by the laser system, typically by reduction of power, in which the transfer function is set so that it does not have an "instant response" characteristic. For example, if the difference between measured power emitted from the transmitter and measured power received by the receiver is small compared to allowed levels, it delays the response, thus reducing the effect of noise.
  The transfer function, when represented in terms of the laser power or gain, in phase-delay space, has the following properties:
    It has negative gain when the difference signal exceeds a predefined threshold, in that the laser power is reduced in response to power lost from the system above that threshold.
    It has a delay in response to difference signals of certain values, that is calculated to be given by the expression:

$$\frac{1.5*10^{-10}*\left(8+\frac{4393749257}{5000000000}*e^{\left(\frac{\lambda}{10.857}-115\right)}\right)^4}{(P_{transmitter}-P_{receiver})^4} >$$

$$\tau_{delay} > \frac{1.5*10^{-12}*\left(8+\frac{4393749257}{5000000000}*e^{\left(\frac{\lambda}{10.857}-115\right)}\right)^4}{(P_{transmitter}-P_{receiver})^4}$$

where $P_{transmitter}$ is the laser power emitted by the transmitter measured in Watts,
    where $P_{receiver}$ is the laser power received by the receiver measured in Watts,
    where $P_{transmitter}-P_{receiver}$ is the power difference used in generating the delta signal used hereinabove,
    where $\lambda$ is the laser wavelength measured in nanometers, and
    where $\tau_{delay}$ is the time delay of the hazard prevention system for a given difference between $P_{transmitter}$ and $P_{receiver}$ from the time the hazard occurred until the time the system has reached a safe state, measured in seconds.
  It has a saturation level for $P_{transmitter}$ and $P_{receiver}$ defined as the level of the difference between $P_{transmitter}$ and $P_{receiver}$, at which an increase of 1 db or more in the level, results in $P_{transmitter}$ decrease essentially identical to the decrease in $P_{transmitter}$ caused without such increase.
  The saturation level is defined as being a power loss level above a certain predetermined power loss, such as 10 mW for a typical domestic charging environment. At that exemplary saturation level, the $T_{delay}$ according to the regulations cited above, would be less than approximately 5 μsec, being slightly more than to the maximal permitted exposure duration at 10 mW, and a 5 μsec response time corresponds to a frequency response of 200 Khz. Therefore, according to the last criterion above, this would mean that should the system indicate a loss of power above this saturation level, the value of $T_{delay}$ would be negligible, and thus the response time at these high power losses would be indistinguishable from each other, and would have to be performed at the same high speed. Thus, should the saturation level be chosen at a higher value, response to all events requiring even quicker response times would be the same. This enables using a system with a lower frequency position of its band-pass, that still responds to high frequency signals. Thus the large signal dynamic range is accounted for, while maintaining a large effective bandwidth.

The response of the system to delta signals requiring a quick response time, above the chosen saturation level, does not generally involve the delay mechanism (also referred to as the event clock) at all. This saves the need to differentiate between such high amplitude delta signals, which may be prone to noise.

The minimal delay time has two advantages, it allows the system to utilize the delay to reduce the effect of noise and prevent transmitted power to be decreased due to errors, but at the same time, it keeps the system safe.

There is thus provided in accordance with an exemplary implementation of the devices described in this disclosure, a
a system for providing wireless power supply to at least one receiver, the system comprising:
(a) a transmitter adapted to emit a beam of wireless power;
(b) a power meter configured to generate a first signal corresponding to the power level of the emitted beam;
(c) a detector associated with the at least one receiver, and configured to generate a second signal corresponding to the power of the beam received at the receiver;
(d) at least one controller, the at least one controller adapted to:
(i) generate a time period $T_{delay}$, being less than the maximal safe exposure duration for the difference in power measured by the power meter and the detector;
(ii) dynamically generate a new $T_{delay}$ if the difference in power has changed by more than a significant amount; and
(iii) modify at least one operational parameter of the transmitter to reduce the difference in power, should $T_{delay}$ be exceeded.

Such a system may comprise a frequency selective signal processor to process a signal corresponding to the difference in power, prior to the generation of $T_{delay}$. In either such case, if the difference is above a predetermined level of power, the controller may be configured to respond without waiting for $T_{delay}$ to be exceeded, before modifying the operational parameters of the transmitter to reduce the delta signal. Alternatively, the frequency selective processor may be configured such that its pass-band is set to cover frequencies significantly lower than the range that would be required to respond within a time period mandated by the maximal level of difference signals expected.

Furthermore, according to yet another implementation, the frequency selective processor may be configured such that its frequency response curve is shifted to lower frequencies than those indicated by the center of the range of frequencies which would be required to provide amplification over the range of exposure durations expected from the power transmission system. In such a case, the shift of the frequency response curve may provide increased amplification to low level power difference signals, such that the processor can respond to changes in these low level signals. Additionally, the shift of the frequency response curve may provide increased amplification to low level power difference signals, such that those low level power difference signals can generate a sufficiently high processor output above the noise level, to trigger the laser safety routine.

In any of the above described systems, the controller may further be configured to calculate $T_{delay}$ as a function of difference signals previously generated. In that case, difference signals below a predetermined ambient level may be indicative of no significant beam obstructions between the at least one transmitter and the at least one receiver. If so, then if the difference signal falls below the ambient level for a pre-determined amount of time, the generation of $T_{delay}$ is not significantly based on any previous difference signals.

Additionally, in any of the systems involving controllers configured to calculate $T_{delay}$ as a function of difference signals previously generated, the system may be configured to respond to any difference signals above the ambient level by either calculating $T_{delay}$ for signals below a predetermined level and above the ambient level, or by responding without relating to $T_{delay}$ should the difference signal be above the predetermined level. Alternatively, the system may be configured to respond to any difference signals above the ambient level by either calculating $T_{delay}$ for signals below a predetermined level and above the ambient level, or by modifying the operational parameters of the transmitter to reduce the delta signal.

In any of the above described systems, the frequency selective processor may comprise an amplifier. Furthermore, in any of such systems, step (iii) may be performed should the elapsed time from step (i) exceed $T_{delay}$.

Further in other embodiments of the above described systems, the modifying of at least one operational parameter of the transmitter may comprises at least one of:
modifying the power level of the beam;
terminating lasing completely;
changing the beam profile of the beam emitted;
blocking the beam;
directing the beam to a different location, by using a scanning mirror to steer the beam;
scanning the area around the current scan position to better align the beam onto the receiver; and
recording the scan position of the location that signified an object in the beam path.

There is further provided in in accordance with another exemplary implementation of the devices described in this disclosure, a method for safe wireless power supply to at least one receiver, the method comprising:
(a) transmitting power from at least one transmitter to at least one receiver;
(b) generating a first signal corresponding to the level of power emitted by the at least one transmitter;
(c) generating a second signal corresponding to the level of power received at the at least one receiver;
(d) generating a difference signal, the difference signal being the difference between the second signal and the first signal;
(e) generating a time period $T_{delay}$, being less than the maximal exposure duration relating to a safe exposure duration for the power indicated by the difference signal;
(f) monitoring whether the difference signal has changed by a predetermined amount, and if so, returning to step (e); and
(g) should $T_{delay}$ be exceeded, modifying at least one operational parameter of the wireless power supply in order to reduce the difference signal.

In that method, the system may respond to difference signals above a predetermined level without using $T_{delay}$ to determine the time period to wait before the modification of at least one operational parameter of the wireless power supply. Additionally, the $T_{delay}$ may be calculated by averaging the difference signal for an amount of time dependent on the level of power indicated by the difference signal, such that difference signals indicating a high level of power have a shorter averaging time than difference signals showing a lesser amount of power.

In yet another implementation of the systems of the present disclosure, there is described a system for laser power transmission from a transmitter to at least one receiver, the system comprising a hazard prevention system comprising:
a power monitor measuring the laser's optical power emitted from the transmitter; and
a power sensor for measuring the laser's optical power at the at least one receiver;
in which the hazard prevention system is configured to cause the laser's power to be reduced or terminated in response to an increase in the difference between the measurements of the power monitor and the power sensor, after a time delay after the occurrence of the difference increase, the time delay, measured in seconds, being:

$$\frac{1.5*10^{-10}*\left(8+e^{\left(\frac{\lambda}{10.857}-115.129255\right)}\right)^4}{(P_{transmitter}-P_{receiver})^4} >$$

$$\tau_{delay} > \frac{1.5*10^{-12}*\left(8+e^{\left(\frac{\lambda}{10.857}-115.129255\right)}\right)^4}{(P_{transmitter}-P_{receiver})^4}$$

where $P_{transmitter}$ is the laser power measured by the power monitor, measured in Watts; where $P_{receiver}$ is the laser power measured at the power sensor, measured in Watts; and where $\lambda$ is the laser wavelength measured in nanometers.

Yet another exemplary system describes a system for safe wireless power supply to at least one receiver, the system comprising:
(a) a transmitter adapted to emit a beam;
(b) a power meter for measuring the power level of the emitted beam;
(c) a detector associated with a receiver, and configured to detect at least a portion of the beam received at the receiver; and
(d) a frequency selective signal processor adapted to:
  (i) generate an output signal representing a time period $T_{delay}$, being less than the maximal exposure duration relating to safe exposure durations for the difference in power measured by the power meter and the detector; and
  (ii) monitor the elapsed time since the generation of the $T_{delay}$ and modify at least one operational parameter of the transmitter to reduce the difference, should $T_{delay}$ be exceeded; wherein the frequency selective processor is configured such that if the output signal is above a first predetermined level, the frequency selective processor has a response characteristic such that it modifies an operational parameter of the system without significant processing.

In such a system, the frequency selective processor may have a frequency response biased towards low frequencies, such that the difference signals having levels less than a second predetermined level, and associated with exposure durations, significantly longer than the allowed exposure duration levels of power exposures above the first predetermined level, are amplified more than signals above the first predetermined level.

Finally, according to yet another embodiment of these systems, there is provided a system for safe wireless power supply to at least one receiver, the system comprising:
(a) a transmitter adapted to emit a beam of wireless power;
(b) a power meter configured to generate a first signal corresponding to the power level of the emitted beam;
(c) a detector associated with the at least one receiver, and configured to generate a second signal corresponding to the power of the beam received at the receiver;
(d) at least one controller, adapted to:
  (i) determine an energy limit for accumulated exposure permitted for the power level relating to the difference in power measured by the power meter and the detector;
  (ii) dynamically generate a new energy limit if the difference has changed by more than a significant amount; and
  (iii) modify at least one operational parameter of the transmitter to reduce the difference, should the energy limit be exceeded.

BRIEF DESCRIPTION OF THE DRAWINGS

The present invention will be understood and appreciated more fully from the following detailed description, taken in conjunction with the drawings in which.

DETAILED DESCRIPTION

Figure 1:
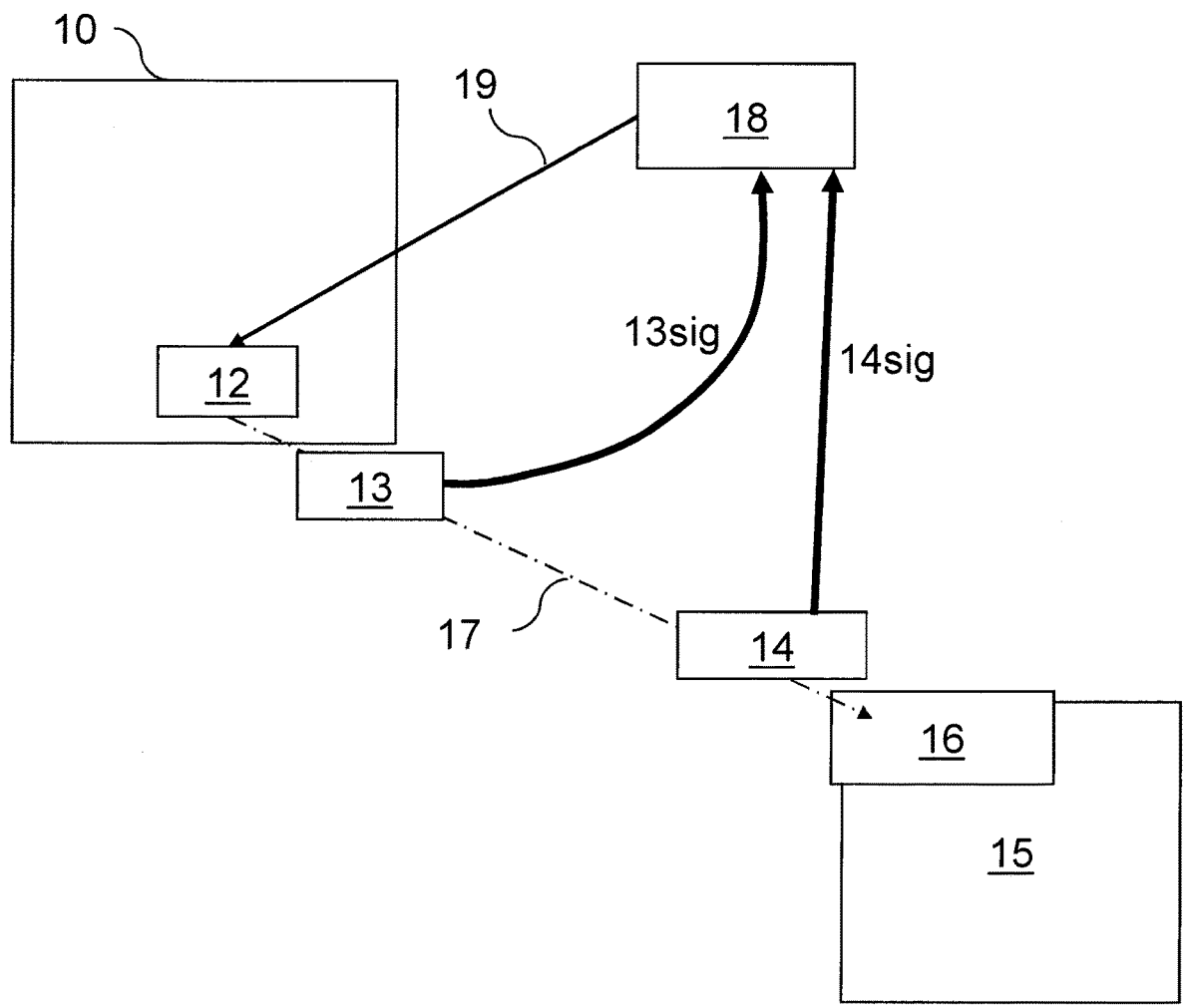
FIG. 1 shows a typical example of a wireless power supply system, according to the present application.

Reference is now made to FIG. 1, which illustrates a typical setup of a wireless power supply system. A transmitter 10 is shown, comprising a beam generator 12, for example a laser, directing an optical beam 17 towards a receiver 15. In order to measure the power level of the laser beam emitted by the transmitter, the system comprises a first power meter 13, called the transmission power meter. The transmission power meter 13 may be situated inside the transmitter 10, or in the beam path at the exit of the transmitter. This power meter may sample the emitted beam at a high sampling rate, for example at a frequency of 5 kHz or more, such that changes in power of the beam being emitted are obtained by the system in real-time, without delay.

Typically, the receiver 15 contains a photovoltaic cell 16, which converts the optical energy of the beam into usable electric energy, usually for charging or powering a device associated with the receiver. Should portions of the beam be directed at surfaces other than the receiver power absorbing aperture, the stray beam may cause dangerous, laser generated damage. Any surface, whether fully reflective or only partially reflective, or absorptive, such as mirrors, human body, animals, cameras, glass surfaces, metallic surface and sensitive equipment, could present a hazardous situation should a beam be mistakenly directed onto them.

Thus, a second power meter 14 associated with the receiver, the receiver power meter, may be incorporated to measure whether the receiver is receiving all, or at least a large portion of the beam directed at it, such that the system can determine whether an appreciable portion of the beam, or even any portion of the beam, is being directed elsewhere, with potentially dangerous consequences. The receiver power meter 14 may receive a portion of the beam from a beam splitter (not shown) located in the receiver, or, in other cases, a current meter, voltage meter or the photovoltaic cell itself may be used as a power meter in the receiver. The portion of the beam received by the receiver power meter is proportional to the beam power impinging on the receiver.

The system also includes a controller 18. The controller 18 receives a signal $14_{sig}$ from the receiver power meter 14 representing the amount of power detected at the receiver. The controller also receives a signal $13_{sig}$ from the transmission power meter 13 representing the amount of power of the laser beam 17 exiting the transmitter 10.

The controller 18 compares the signal $14_{sig}$ of the beam detected by the detector 14 to the signal $13_{sig}$ representing the amount of power emitted by the laser 12. Should the difference between these measured powers be significant, an indication of a hazardous situation may be generated by the system, since a significant amount of power emitted by the transmitter is unaccounted for by the receiver device, and thus may be impinging on a surface other than the receiver device where it could cause damage. Therefore the system continuously performs a check to ascertain the level of the unaccounted-for power. The controller is configured so that if the level exceeds a predetermined threshold, the controller responds in order to reduce or eliminate this unaccounted-for beam power by causing at least one of the following:

Modifying the power level of the beam;
Terminating lasing completely;
Changing the beam profile of the beam emitted;
Blocking the beam; Directing the beam to a different location, for example to a beam dump, typically by using a scanning mirror to steer the beam;
Scanning the area directly around the current scan position in order to attempt to better align the beam onto the receiver, and, should the scan find a position at which the difference signal drops, instructing the transmitter to use that more optimal scan direction;
Recording the scan position of the location that signified an object in the beam path; and
Changing any other operational parameter of the system.

During lasing, a reduced level of power impinging on the receiver is generally associated with an object traversing the path of the beam. The controller should thus be able to modify the laser output according to the level of power indicated as lost between the trasnmitter and the receiver device, to protect any such objects which have entered the path of the beam. Sampling of the power at the transmitter and receiver should be performed at a high enough rate to ensure that indications of changes in the portion of beam received, are obtained sufficiently rapidly to comply with the safety regulations mandating such protection. There will be explained hereinbelow, the implications of the sampling rate on the ability of the system to respond correctly temporally, both to low leakage powers occurring over long periods, and to high leakage powers, which have to be curtailed rapidly and therefore require a fast time response of the system.

Figure 2:
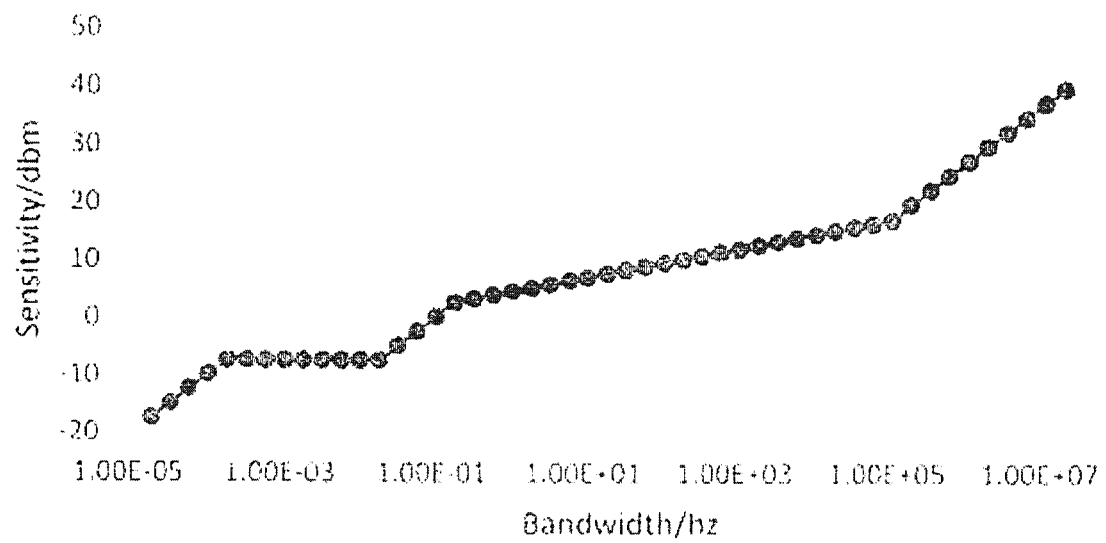
FIG. 2 illustrates one particular regulation for the permissible exposure duration at different laser beam power levels.

Reference is now made to FIG. 2, which illustrates one particular regulation for the permissible exposure duration at different laser beam power levels. The particular graph shown gives the maximum permitted exposure level in dbm, for exposure to illumination having a wavelength of 1050 nm and for a beam diameter of 7 mm, and having a Gaussian profile. The abscissa, shows the bandwidth in Hz. required of an amplifier or processor, in order to successfully handle the response time implicit by the maximum exposure time permitted for the plotted exposure levels.

The system as shown in FIG. 1 must ensure that those portions of the beam that are not accounted for, namely the difference between the signal received at the detector and the amount of power emitted by the transmitter, and which therefore may impinge on humans or other object in the field of view, do not exceed the guidelines for maximal permissible exposure durations, as permitted by the various national regulations. The curve in FIG. 2 is obtained from the US Code of Federal Regulations Title 21, Volume 8 Revised as of Apr. 1, 2018 [CITE: 21CFR1040.10]. The graph shows the permitted time of exposure, expressed as an effective frequency of response of the measurement system, as a function of the power level to which the object is exposed, expressed in dbm, for a 7 mm Gaussian beam at 1050 nm wavelength.

As the power level of the beam increases, the permissible time of exposure decreases. Thus, should the controller indicate that a large portion of the power of a high power beam is unaccounted for, it is necessary to modify the system parameters very rapidly. Alternatively, should the controller signify that only a small portion of the beam power is missing, a longer period of time is allowed to elapse before the controller must instruct the laser to moderate or divert its beam, as shown in FIG. 2. Thus, for instance, for the 7 mm. beam whose allowable exposure level is shown in FIG. 2, for a power level of 0 dbm (1 mW), the allowed exposure time according to the above referenced regulation, is of the order of 10 seconds, so the bandwidth of the control loop required to respond within that 10 seconds should extend up to at least 0.1 Hz. Likewise, for the same beam but having a power of 10 dbm, the allowed exposure time is of the order of 5 ms, so the bandwidth of the control loop required to respond within that time should extend to at least 200 Hz.

To provide more non-limiting examples of these levels of protection according to the above referenced regulation, and to show how the level of protection required depends on several parameters of the beam, if a system using a circular beam having a diameter of 10 mm, and a uniform beam profile, which is the preferred beam profile for conversion by a photovoltaic cell to electric energy, and with a wavelength of 1050 nm, shows that 6.8 milliwatts of power are unaccounted for, the beam needs to be terminated within a time period of 1 second.

On the other hand, should the beam profile be Gaussian, if the system would show only 5.35 milliwatts of missing beam power, the laser beam would need to be terminated or modified within 1 second.

Similarly, should a similar system using a Gaussian beam having a diameter of 7 mm indicate that only 3.3 milliwatts of the beam are unaccounted for, that beam would need to be terminated within 1 second.

Should the wavelength of the beam change from 1050 to 1060 nm, as may be the case due to changes in laser temperature, the permissible exposure duration for a 10 mm Gaussian beam in a system showing that 5.6 milliwatts of power are unaccounted for is 1 second It should be noted that the term "safe exposure time" for exposure to a specific beam power, is understood in this disclosure to refer to any time period less than the maximal permissible exposure time allowed by regulations in force at the time of use, for that beam power. As is observed in the full extent of the graph of FIG. 2, the permissible exposure duration may vary from nanoseconds to tens of hours, depending on the level of power lost during transmission of the laser beam, and the range of power levels to be monitored ranges from a few microwatts to the order of 10 watts.

Thus, the requirement of a signal handling system that can handle the required response to a signal representing a missing power of 10 W, is that it must have a dynamic range typically exceeding 60 dB and a frequency response extending to approximately 10 Mhz, corresponding to a response time of the order of 0.1 microsecond. Such a large signal dynamic range, in combination with a bandwidth which covers up to such a high frequency are practically impossible to achieve in presently available electronic technology, whether analog or digital. Therefore, it is an objective of the present invention to provide a system that has the capacity to be sensitive to all power levels within such a large dynamic range of the power, and to react within the most efficient time given by the regulation requirements for the maximum power measurement expected, namely as fast as 100 nanoseconds or so for the above mentioned 10 W power range.

Figure 3:
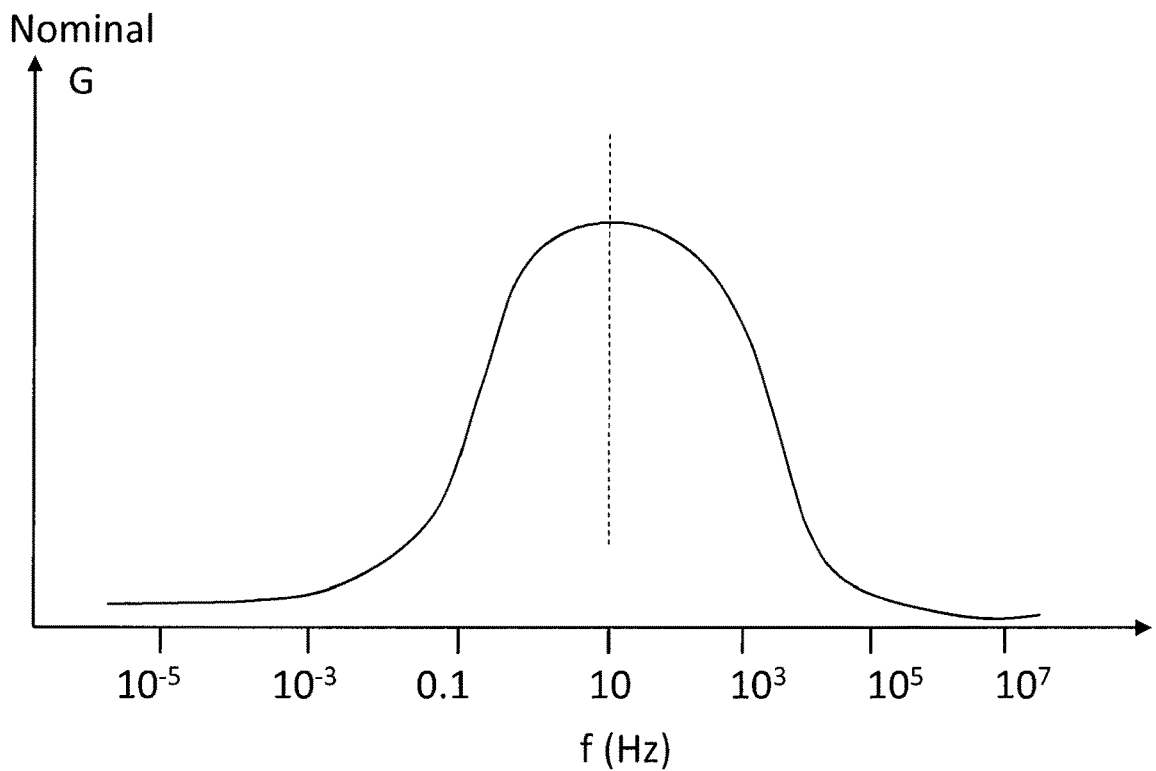
FIG. 3 shows a schematic representation of the response curve of a prior art amplifier, processor or control system over the entire range of frequencies shown in FIG. 2.

Reference is now made to FIG. 3 which shows a schematic representation of the response curve of a prior art amplifier, processor or control system over the entire range of frequencies shown in FIG. 2. The axes are logarithmically plotted because of the very large ranges involved. In the example chosen, the peak amplification stretches around a central frequency of 10 Hz, and is shown as having significantly useful response covering two decades or slightly more, both above and below that frequency. This range of response is not intended to be limiting, but just shows a typical range illustrative of the problem which the current methods and systems attempt to solve. As is indicated in FIG. 3, the typical time exposures corresponding to the response frequencies where there is significant amplification, range from several hundred microseconds or so, to a few tens of seconds, or so. Outside of that range, the amplification, or, at the low frequency end of the spectrum, the ability of the amplification system to distinguish a real signal from the noise level of the signal, may be too small to be able to provide proper warning of the need to trigger the safety features of the system if the allowed power is exceeded. In practice, speed of response of the amplifier system is implemented not only by the electronic response characteristics of the amplifying and control circuits, but also by the sampling rate at which the system samples the measured power to determine whether the threshold has been reached.

It should be emphasized that the frequency ranges discussed in this example are levels which may be typical for everyday domestic situations, but are not meant to be limiting for every situation.

Referring back now to the levels of errant beam power exposure, associated with which the safety regulations define the maximum exposure times allowed, as shown in FIG. 2 for instance, it is seen that the range of beam powers whose levels permit the above exemplary range of exposure times, range from several hundred microwatts to a few tens of milliwatts, for such typically sized beams. Thus, powers falling outside of this range will likely not be sufficiently amplified by the system, which will not therefore be able to generate the correct instruction to the system to reduce or divert the beam should the power threshold for the errantly directed beam be exceeded for longer than the permitted time. There are two distinctly different situations with regard to this lack of the ability to respond.

At the high power end of the response curve, where only very short exposure is allowed, and the amplifying system must respond very quickly to shut down or divert the beam transmission should that power be exceeded, the situation is such that although the amplification is very low, the lack of amplification is more than made up by the magnitude of the signal input to the amplifier, resulting from a significantly high level of power. Therefore, despite the apparent insufficient amplification level of the system at those high frequencies, the high signal level makes up for that low amplification, thus providing sufficient output signal to trigger the safety regulation steps for reducing the radiation. However, at the low power end of the response curve, where long exposure can be allowed, running into many hours and even days for the very lowest powers regulated, there is no such compensating mechanism whereby the power level itself makes up for the drawbacks in the amplification at such low frequencies, as reflected in the inability of the amplification system to differentiate the signal from the noise level. Furthermore, although the power levels involved may sound almost negligible, there is still a maximum regulatory period allowed for exposure of a human to such low powers, and the safety system of the transmitter must be able to ensure that that criterion is properly complied with. Additionally, at these low powers, the system must still be capable, as at all times, to be able to respond rapidly to a large increase in leaked power which must trigger the safety actions within the permitted exposure time.

Figure 4:
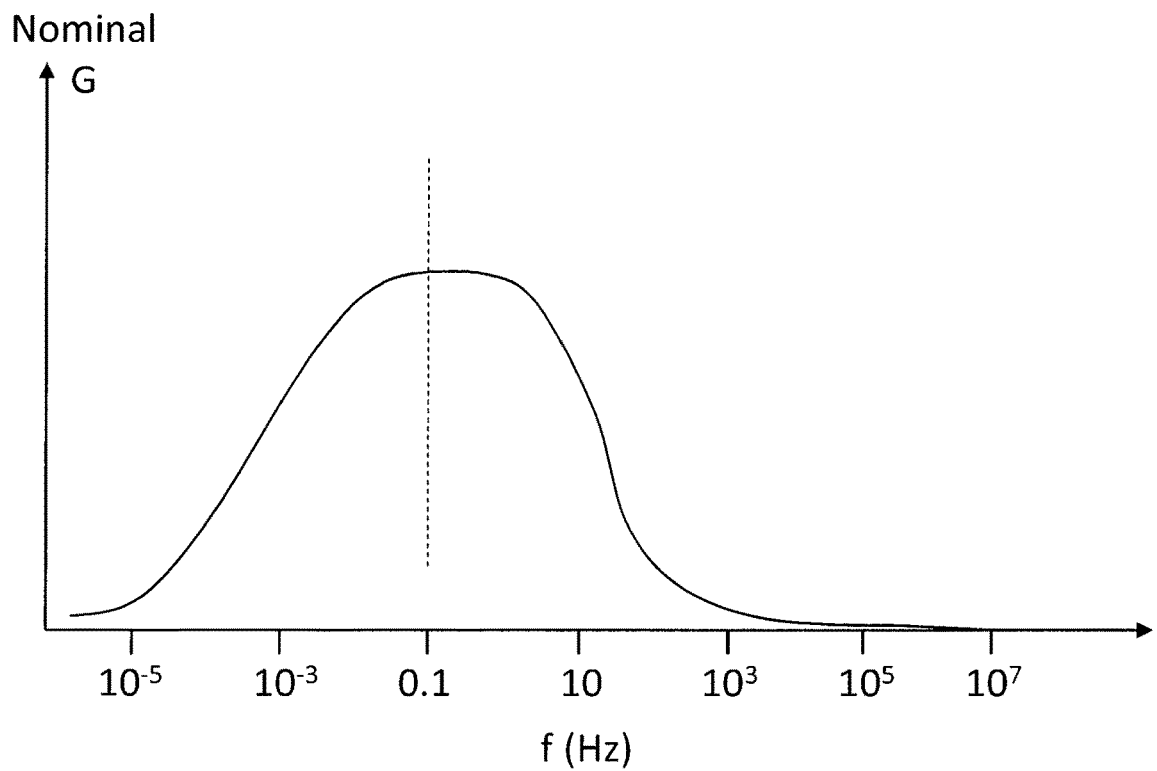
FIG. 4 shows a schematic representation of the response curve of an amplifier, processor or control system constructed such that its frequency response curve is shifted to lower frequencies than those indicated in the curve of FIG. 3.

In order to achieve that aim, according to a first implementation of the system of the present disclosure, as shown in FIG. 4, the amplifier is constructed such that its frequency response curve is shifted to lower frequencies than those indicated by the center of the range of frequencies which should be handled by the amplifier. By virtue of this shift to lower frequencies, the very small signals generated at the power meter by the low power levels associated with long allowable exposure periods, undergo a larger level of amplification above the noise level, than they would using prior art amplifier selection criteria, and hence, compensation is provided for that low signal level, to enable them to generate a sufficiently high output above the noise level, to trigger the laser safety routine. Thus, in FIG. 4, it is clear that by shifting the center of the frequency response to 0.1 Hz. instead of 10 Hz., the amplification in the very low frequency ranges is substantially increased, thereby providing a sufficient output signal for those low power stray beams to actuate the beam safety system.

On the other hand, as previously explained, at the high power end of the spectrum of beam powers, the shift of the amplifier frequency response curve to a lower frequency, thereby reducing even further the low amplification provided at that end of the spectrum, has a lesser effect on the efficiency of the safety warning system, since the signal generated by the high stray beam power is so large, that even the reduced amplifier sensitivity in that high frequency range, will still generate sufficient output to operate the safety system.

However, there still remains a functional problem of how to implement this increase in sensitivity at low powers while ensuring that the system responds to high powers sufficiently speedily. The need to respond speedily to a large increase in detected power essential remains, whether the power being detected is low or high. The response time manifests itself in the form of the sampling rate which the system uses in order to measure the power. The shorter the power measurement response time required, the higher is the sampling rate which the system must use to measure that power. Therefore, the fast response time of the system to an increase in power to the maximum expected by the system, must be maintained even when very low powers are being detected. The sampling rate may typically be chosen to be three or more times the maximal permitted exposure duration for a power difference signal showing a complete beam obstruction. A system using a sampling rate at this frequency would allow a sudden spike in the power difference signal to be monitored for at least one more sample before required modification of lasing, thus allowing for an albeit short averaging calculation to be made before a response is acquired, in which the signal may drop down to an acceptably low amount.

On the other hand, the sampling rate may be chosen to be substantially the same, but never less than, what is equivalent to the maximal permitted exposure duration for full loss of the beam. The sampling rate may even be chosen to be two or less samples within this time limit.

However, as previously mentioned, a fast response time, and thus a high sampling rate, brings with it an increase in the sensitivity to noise. The increase in amplifier sensitivity at low powers, as mentioned above, increases this effect.

In order to achieve these aims, an effectively variable sampling rate may be used in the systems of the present disclosure. The response time manifests itself in the form of the sampling rate which the system uses in order to measure the power. The shorter the power measurement response time required, namely, the higher the errant power level to be detected, the higher the sampling rate which the system must use to measure that power. Therefore, to ensure that the highest powers capable of being emitted by the system are acted upon within the permitted time limit for that power level, the sampling rate must be maintained at a high rate, typically a few times faster than the rate at which the time between samples would be the maximum allowed safe time for the maximum system power. However, as already mentioned, a fast sampling rate leads to excessive sensitivity to noise, and at low emitted powers, the signal generated by the detected power may be difficult to extract from the noise level, possibly resulting in premature activation of the threshold shutdown or beam diversion procedure.

In order to overcome this problem, the control may be designed such that for low levels of the measured power signal, the sampling rate may be reduced, and the power signal responded to with less urgency. However, the sampling rate must still be maintained at above that required to respond within the maximum time allowed for the maximum exposure expected. When the system power itself is low, the sampling rate may be less frequent, since the maximal permissible time of exposure for that beam is longer, thus changes in the power signal do not need to be responded to in such a short time.

The controller can be advantageously configured such that there may be a time delay between receiving an indication of a loss of power, and the controller actually acting on the signal level received, and modifying the system. This time delay enables the system to determine whether the signal detected really is due to the power loss continuing over the entire sampling period, indicating a probably real instance of power being diverted somewhere along its transmission path, or whether it is a result of excessive noise detected at those low signal levels. This is achieved by averaging the power signal up to the end of the time delay and using that averaged signal to come to the decision whether the threshold has been reached and that the laser should be terminated or diverted, or whether the signal is just due to noise pickup, or results from a transient event, and can be ignored for the considerations of determining whether a real safety threshold time has been reached. The time delay is a function of the maximal permissible duration for the power loss detected at the power signal. The time delay must be slightly less than the maximal permissible duration for that loss of power.

Figure 5A:
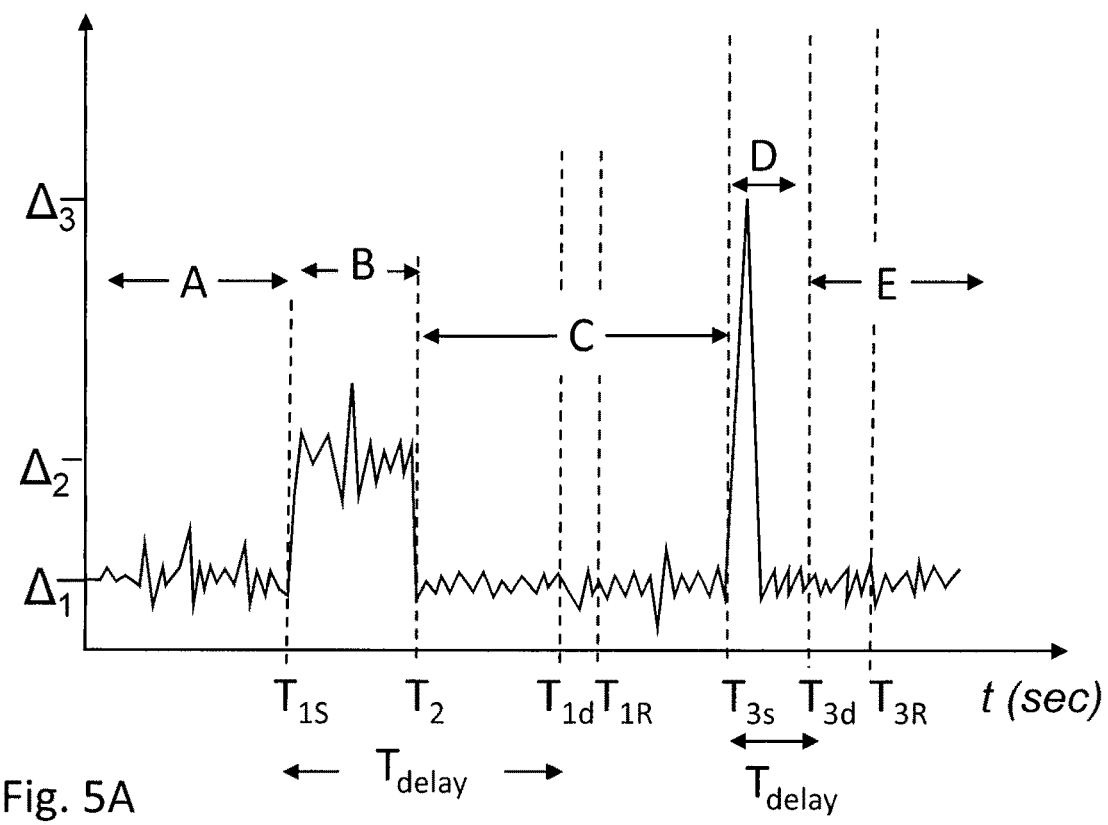
FIG. 5A is an exemplary plot of the differential power signal obtained in a typical detection scenario, as a function of time.
Figure 5B:
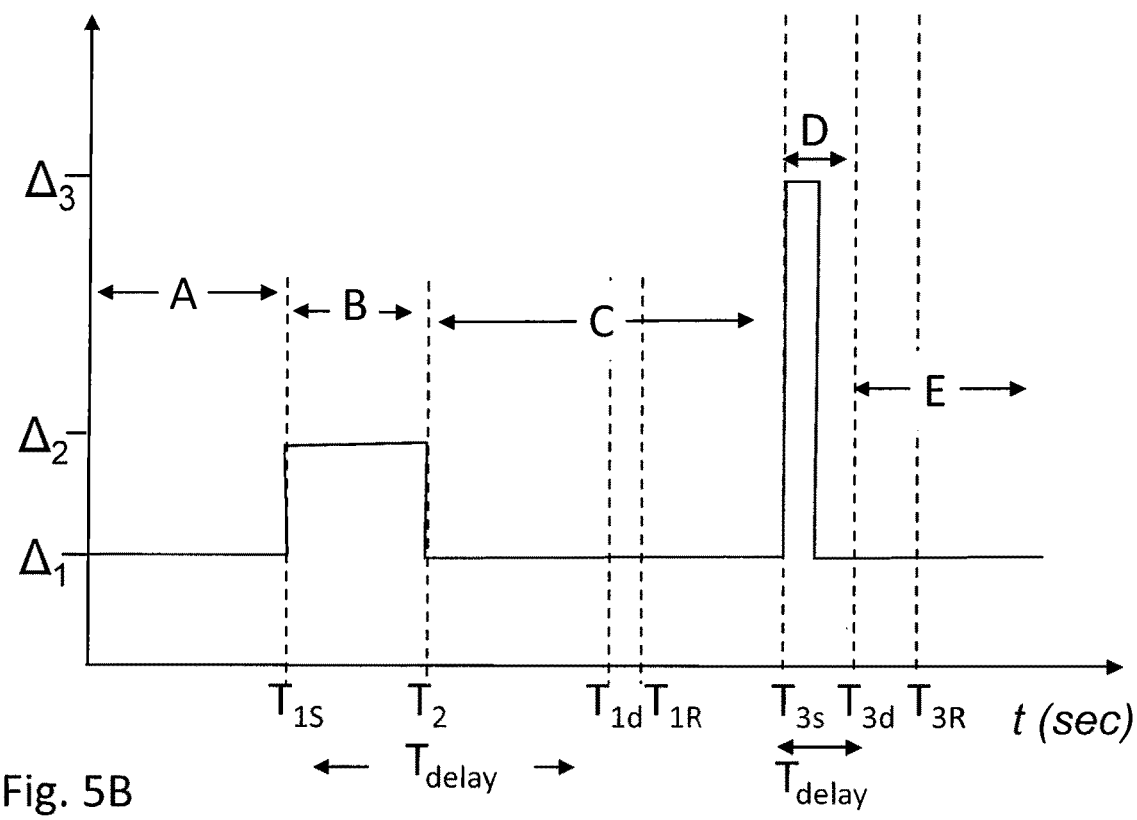
FIG. 5B shows the resulting control signal generated by the power profile shown in FIG. 5A.
Figure 5C:
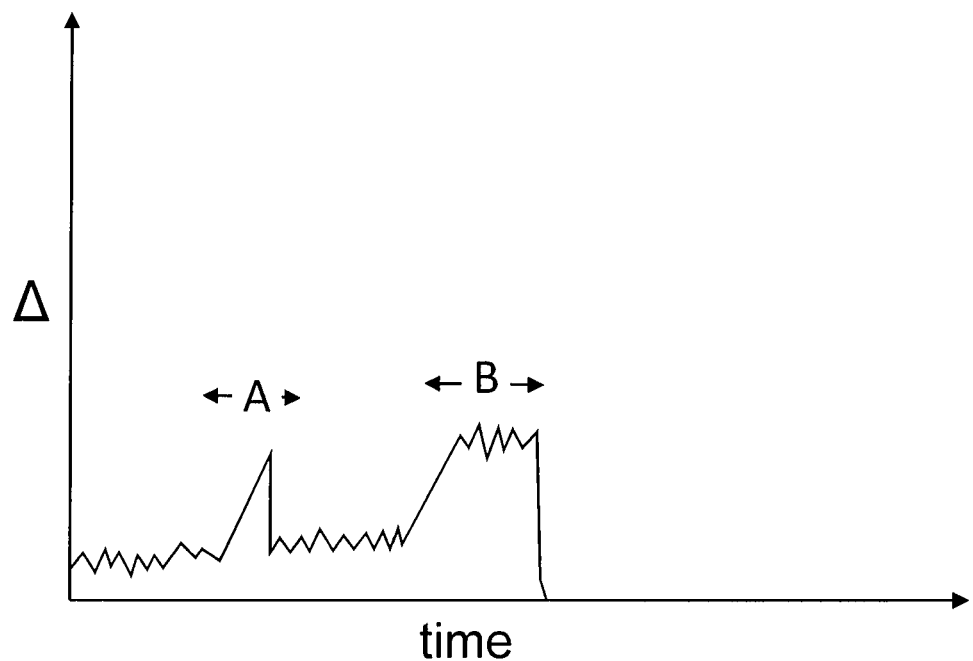
FIG. 5C illustrates a situation in which a short noise spike "A" is ignored by the system.

The advantageous outcome of this procedure is now demonstrated in FIGS. 5A, 5B and 5C. FIG. 5A is an exemplary plot of the differential power signal, namely the power level of the beam power lost during transmission, obtained in a typical detection scenario, as a function of time. The symbol $\Delta$ represents the differential power as measured by the difference between the transmitted power, and the actual power incident on the receiver. $\Delta$ is plotted as a function of the elapsed time, t. The average or ambient power level $\Delta 1$ shown in the regions of the graph marked A, C and E, is so low that the permitted exposure to that level of leakage power is long, and would extend way beyond the total time shown in the graph of FIG. 5A, if no other event involving a larger level of differential power occurred. The sampling rate is maintained at a sufficiently high rate rate, commensurate with the need to respond to a sudden increase of $\Delta$ to the maximum power emitted by the system, such that such an increase in power would result in the system maintaining proper safety protection.

However, at the point in time marked $T_{1s}$, an event occurred, possibly the short term intrusion of a partially absorbing object into the path of the transmitted beam, causing the $\Delta$ to rise to a level $\Delta_2$ which, according to the mandated regulations for a beam having an average power of $\Delta_2$, has a maximum permitted period of exposure extending up to the point $T_{1r}$, such that the difference between $T_{1r}$ and $T_{1S}$ is the time for which the level of exposure $\Delta_2$ is permitted. According to the present described system, for such a moderate detected power difference as represented by $\Delta_2$, the decision as to whether the increased $\Delta$ represents a significant change that requires a response from the system is delayed by the controller, such that the system is adapted to wait for a delay time before terminating the beam, in order to determine whether the change in the signal is a significant, or real rise in the signal, or whether the spike was caused by noise or a short lived anomalous reading in the system. The delay is determined by the level of lost power which the system is showing, which in the case of moderate power level $\Delta_2$, extends to $T_{1d}$, such that the difference in time between $T_{1s}$ and $T_{1d}$ is the delay during which the system is permitted to wait in order to establish whether the change in the signal to $\Delta_2$ needs responding to, before the permitted exposure time $T_{1r}$ is reached. Indeed, it can be seen that the jump in signal to $\Delta_2$, marked by time period "B", does not require the modification of an operational parameter of the system, such as termination of the beam, since before $T_{1d}$ is reached, the beam obstructive event causing the jump to power level $\Delta_2$ has passed, and the power detected has again dropped to its low level, to approximately $\Delta_1$, at time $T_2$. As a result of this method of signal averaging over the complete time period between $T_{1s}$ and $T_{1d}$, extending into time period C, the control system does not prematurely activate the system trigger for removing the laser emission, as would be performed without the use of such a time delay criterion, and charging service is not prematurely terminated.

In a similar manner, at the time $T_{3s}$, a large spike of lost power is suddenly detected by the system, having a substantially increased detected power level of $\Delta_3$. Such a pulse of power, using a prior art control system, would be rapidly detected, and would immediately shut the lasing down (as an example of the action to be taken) because the high level is indicative that a large amount of the beam is unaccounted for and may be impinging on dangerous targets. This would be done in prior art systems without consideration of the length of the pulse. Using the control system of the present disclosure, the threshold decision is delayed beyond the sampling time, to $T_{3d}$, in order to correctly appraise the level of danger presented by the increased power. It is noted that $T_{delay}$ for this spike in region D is shorter than that for the power increase in region B, since the power level is higher, and hence, the permitted exposure time shorter. By using such a delayed decision response time, the sharp power spike is averaged out over its temporal environment, allowing for a waiting period to determine whether the signal's overall average level falls below that which would mandate a shutdown of the system.

FIG. 5B now shows the resulting control signal generated by the power profile shown in FIG. 5A. Both the moderate level event as shown by time period "B" and the larger jump to $\Delta_3$ during time period "D" are processed by the system, such that they are averaged before inputting into the control system. Neither of the events now trigger the safety threshold, thereby enabling the system of the present disclosure to continue providing charging service without interference, where, in previous systems, the threshold criterion would have been triggered as soon as the first sampling period occurred, and the system shut down.

FIG. 5C illustrates a situation in which a short spike "A" is ignored by the system, since the sampling of the signal and its ensuing averaging, enables the determination that no significant change has occurred since the signal quickly drops down to a low level.

However, when spike "B" is amplified, the system can determine that this increased $\Delta$ signal is rapidly exceeding the permitted duration for such a level of unaccounted-for beam power. Subsequently, the system terminates lasing, and therefore no power is received at the receiver, therefore the $\Delta$ signal drops to zero as shown at the end of time period "B".

Figure 6A:
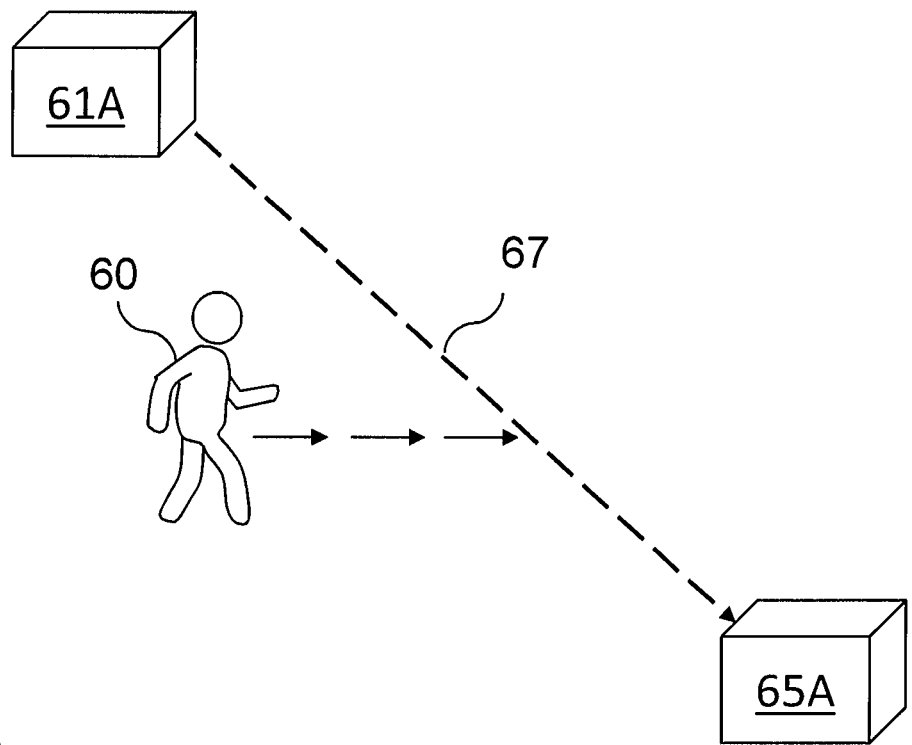
FIGS. 6A and 6B illustrate various scenarios having hazardous situations which may necessitate curtailment or diversion of the laser transmission, to avoid potential laser damage.
Figure 6B:
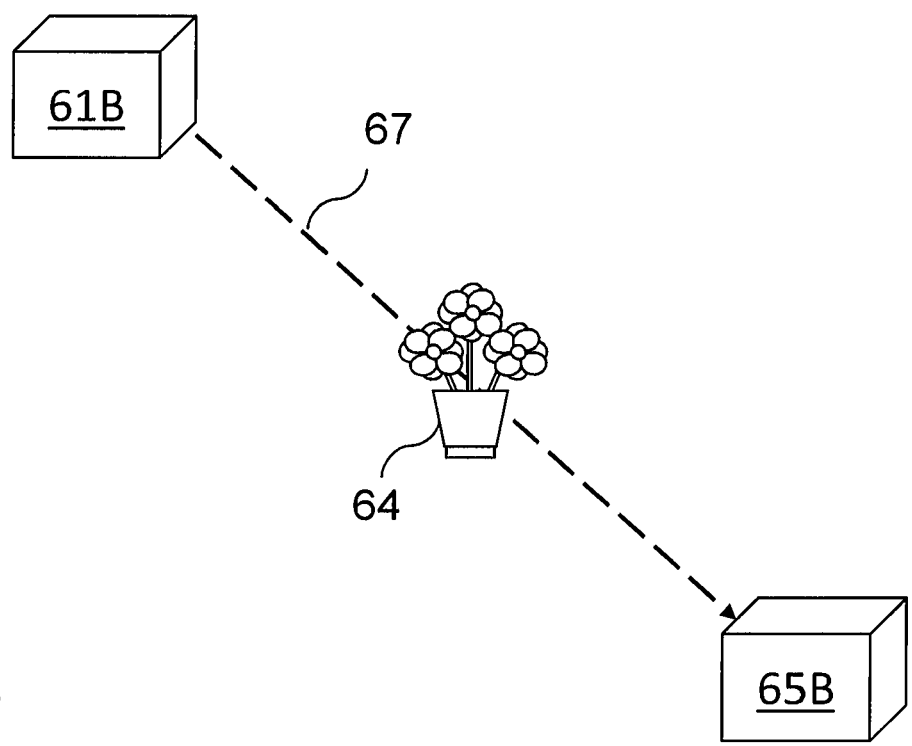

Reference is now made to FIGS. 6A and 6B, which illustrate various scenarios having hazardous situations which may necessitate curtailment or diversion of the laser transmission, to avoid potential laser damage.

FIG. 6A illustrates an exemplary scenario in which a person 60 traverses the beam 67. In such a case, before the person walked into the beam path, the signal received by the receiver power meter would be at its regular high level, and therefore the $\Delta$, or loss of power between transmitter 61A and receiver 65A, calculated by the controller, would be low. Thus, the transmitter 61A may direct a full power beam at the receiver prior to the person walking into the beam.

When the person 60 then enters the beam path 67, the power level received by the detector would drop drastically and thus the difference $\Delta$ between the power detected leaving the transmitter 61A, and that detected at the receiver 65A would be high. That means that a high level of power is being dissipated somewhere in the transmission space, without reaching the receiver, and this potentially presents a high level exposure to the beam. In keeping with the regulations, such a high power exposure must result in reduction of the stray beam in a very short time. Because of the large change in power level and the short period of time in which the system amplification must respond, the system amplifier may not be able to faithfully handle the corresponding change in signal and issue the shutdown or beam diversion instruction within the time required. However, the $\Delta$ signal would be high enough to ensure that the system responds within the small permissible time for that loss of power, despite lack of meaningful amplification at such a high frequency.

FIG. 6B now illustrates a scenario in which a transparent object 64, or an object which only partially blocks the beam, partially obstructs the beam path. Since the change in detected power may be small, such a stray beam power may be acceptable according to the regulations, for a comparatively long period.

The characteristic time period of this event may be long, since, for a low level of errant power exposure, the object may be in the beam path for minutes, or even hundreds of minutes, thus lasing may continue uninterrupted. Prior art systems would not be sensitive to such a small loss of power between the transmitter and receiver over such a long period of time, as the effective frequency of this power change would be too low for them to detect. However, even if $\Delta$, which symbolizes the unaccounted portion of the beam, is very small, and thus its permissible exposure time may be very long, the maximum permissible time level may be exceeded should transmission of power from a transmitter to a receiver occur for an extended period of time.

In the system of the current disclosure, the amplification of frequencies related to very slow changes of input signal and over long periods, is increased in comparison to prior art systems, such that it is more sensitive to events occurring over a long period of time. Combination of these features therefore enables the system to respond correctly over long periods of time, in spite of the increased sensitivity to noise at those low detection levels.

Therefore, the controller shows an increase in signal associated with $\Delta$ should a transparent or partially blocking object be in the beam path over a long period of time. The controller may be characterized to have a limited response, as the permissible level of exposure to such a weak beam may be minutes or even hours. This allows the controller to continue accurate monitoring of this $\Delta$ signal over a long time period to ensure that it does not exceed the time limit for this power level required by guidelines.

In the example shown in FIG. 6B, the vase 64 may be removed from the beam path before the maximal permitted period of time for the power level lost due to object 64 has been exceeded. Thus, the delay time or waiting period utilized by the system, ensures that no changes to the system may be performed unnecessarily.

Alternatively, should the vase 64 remain in the beam path for close to the maximal permitted exposure for loss of that level of power, such that the maximum "waiting period" or delay time allowed before the need to activate the shut-down or beam deviation system, is nearly exceeded, such action may be necessary before that maximal permissible exposure time is exceeded.

Thus, the currently disclosed system ensures that small losses of power between the transmitter and the receiver are accounted for, and an object traversing the beam for a short time would not be subject to as much attention as an object in the path of the beam for a long time. Moreover, the sensitivity of the currently disclosed system to the large dynamic range required is achieved, with the large dynamic range required taken into account.

Figure 7:
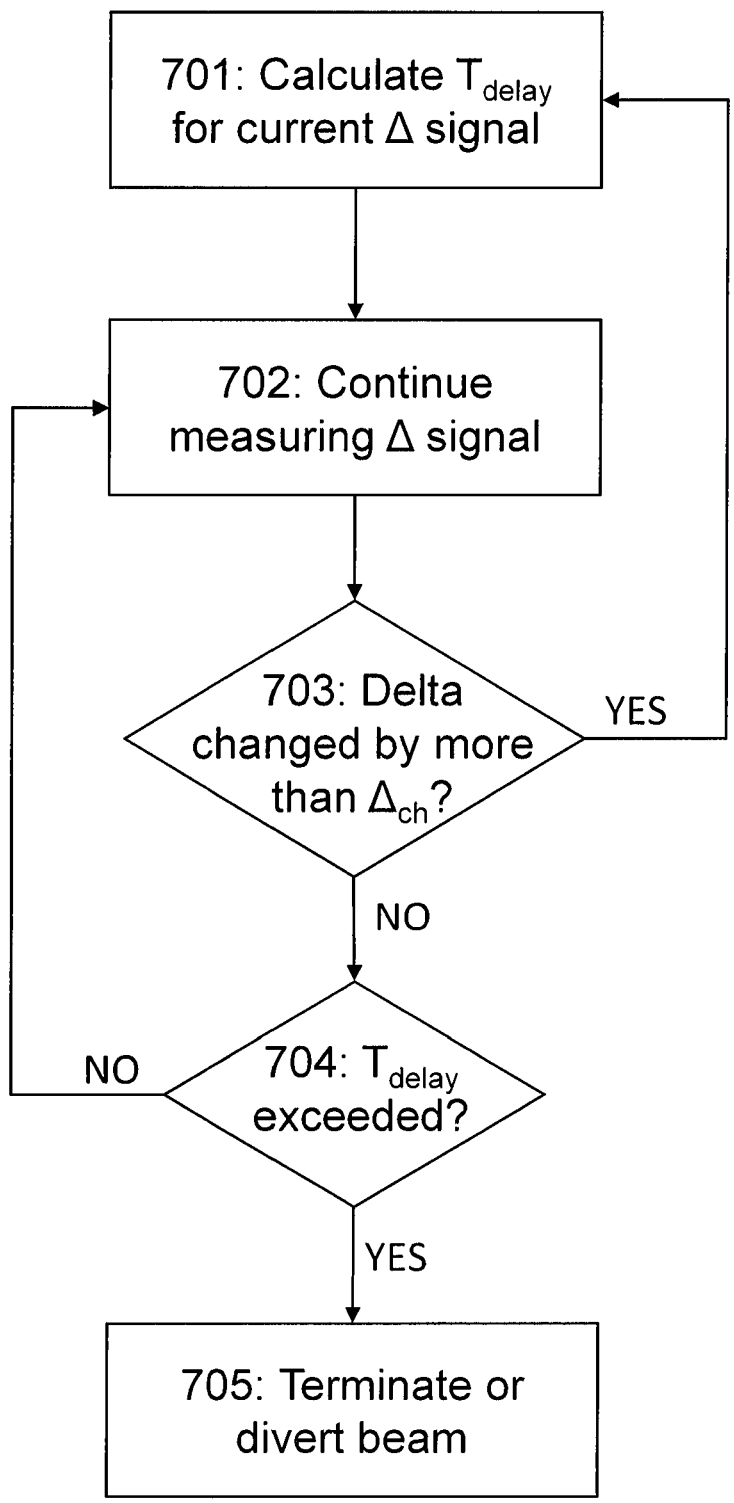
FIG. 7 is a flow chart which illustrates one implementation of the methods used in operating the currently disclosed system.

Reference is now made to FIG. 7, which is a flow chart which illustrates one implementation of the methods used in operating the currently disclosed system.

In step 701, the "event clock" is started, and the system calculates a "waiting period", called $T_{delay}$, this being the length of time which the system will wait from the starting point of this "event clock" before terminating or diverting the beam should the Δ signal not show a significant change, as will be explained hereinbelow. $T_A$ is determined in accordance with the permitted exposure time at the Δ power currently received, according to regulations. According to one exemplary method, in order to calculate the $T_{delay}$, an averaging of the delta signal is performed, with the time over which the averaging is performed being less than the max permissible duration for this power loss. This ensures that anomalous readings such as spikes arising from short noise interferences, do not unnecessarily cause the "event clock" to re-set.

In step 702, the Δ signal is continually measured.

In step 703, the system determines whether the level of the Δ signal has changed by more than a predetermined amount, shown as $Δ_{ch}$. An increase in the Δ signal indicates that more beam loss is occurring than that calculated at step 701, and therefore a different and shorter $T_{delay}$ must be calculated based on this increase of Δ signal and the "event clock" or timing system must be reset to reflect this change. Conversely, a decrease in the Δ signal indicates a drop in beam loss occurring, and therefore a new longer $T_{delay}$ may be calculated based on this decrease of Δ signal and the "event clock" or timing system must be reset to reflect this change.

In an alternative embodiment of the system, should the loss of power indicated be greater than a predetermined saturation level, above which all signals are responded to identically, with the event clock rendered essentially irrelevant in this case, since the system should terminate, the system blocks or diverts the beam without delay. For example, a delta signal indicating 95% beam blockage may cause the system to respond in the same time as a delta signal indicating 99% beam blockage. The saturation level may be chosen to be 10 W or higher, or 9 W or higher, or at other power levels. The saturation level may be dependent on the environment of the wireless power system, or on other parameters.

In step 704, if no change in the Δ signal, greater than $Δ_{ch}$, is indicated, the system evaluates whether the current $T_{delay}$ has been exceeded. If not, control passes back to step 702, and measurement of the Δ signal is continued. On the other hand, should it be indicated that $T_{delay}$ is exceeded, thus the required permissible exposure duration for the current loss of power will shortly be surpassed, control passes to step 705.

In step 705, an operation parameter of the system is activated, in order to prevent excessive beam exposure, such as by blocking, diverting or terminating the beam.

Figure 8A:
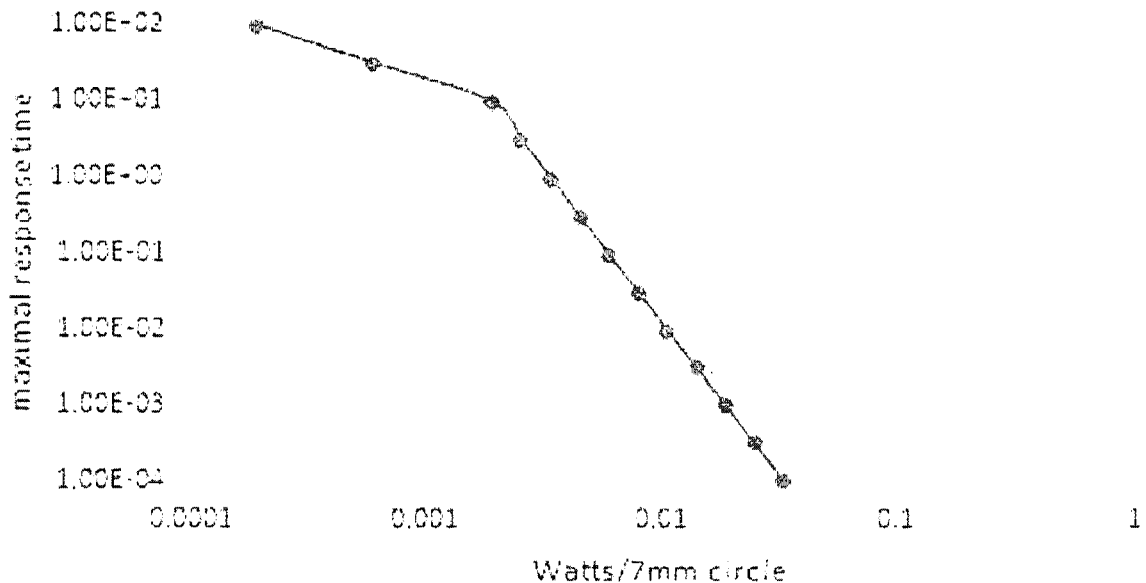
FIGS. 8A and 8B illustrate the permissible exposure time allowed for different power levels, according to a US regulation.
Figure 8B:
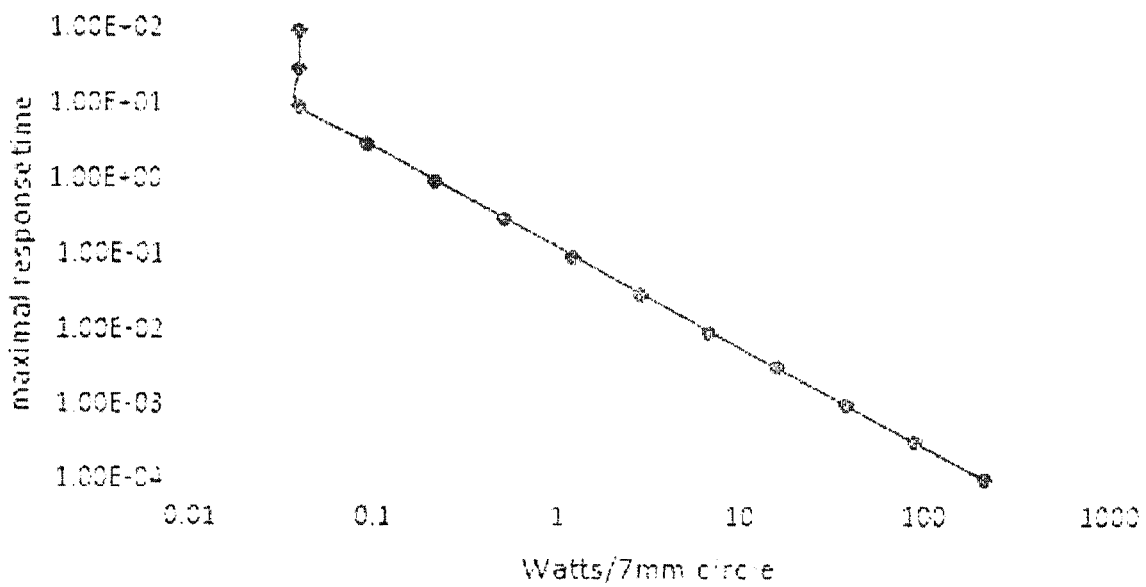

Reference is now made to FIGS. 8A and 8B, which illustrate the permissible exposure time allowed for different power levels, according to the above referenced US regulation. FIG. 8A is the response time required for a beam having a wavelength of 1050 m beam, and FIG. 8B for a beam having a wavelength of 2600 nm. Thus the waiting period or delay time of the controller, may be set such that the maximal delay before terminating the beam or affecting another parameter of the system is within the maximal permitted time for that loss of power.

It is appreciated by persons skilled in the art that the present invention is not limited by what has been particularly shown and described hereinabove. Rather the scope of the present invention includes both combinations and sub-combinations of various features described hereinabove as well as variations and modifications thereto which would occur to a person of skill in the art upon reading the above description and which are not in the prior art.

We claim:

1. A system for providing wireless power supply to at least one receiver, the system comprising:
   (a) a transmitter adapted to emit a beam of wireless power;
   (b) a power meter configured to generate a first signal corresponding to power level of the beam of wireless power emitted;
   (c) a detector associated with the at least one receiver, and configured to generate a second signal corresponding to a power of the beam received at the at least one receiver;
   (d) at least one controller, the at least one controller adapted to:
      (i) determine a time period $T_{wait}$, being less than a maximal safe exposure duration for a difference in power measured by the power meter and the detector;
      (ii) continue measuring the difference in power, and:
         (a) if the difference in power has changed by more than a predetermined amount, dynamically determine a new $T_{wait}$; and
         (b) should $T_{wait}$ be exceeded, modify at least one operational parameter of the transmitter to reduce the difference in power.

2. A system according to claim 1 further comprising a frequency selective signal processor adapted to provide amplification of a signal corresponding to the difference in power, the amplification being dependent on the level of that signal.

3. A system according to claim 2 wherein an upper frequency limit of a pass-band of the frequency selective processor is set at a frequency which is commensurate with a response time to limit exposure to a signal corresponding to a difference in power of the predetermined level.

4. A system according to claim 2 wherein the frequency selective signal processor is configured such that its frequency response curve is shifted to lower frequencies than those indicated by a pass-band which would be required to provide amplification over the range of exposure durations expected from the system.

5. A system according to claim 4, wherein a shift of the frequency response curve provides increased amplification to low level power difference signals, such that the processor can respond to changes in these low level signals.

6. A system according to claim 4, wherein a shift of the frequency response curve provides increased amplification to low level power difference signals, such that those low level power difference signals can generate a sufficiently high processor output above the noise level, to trigger a laser safety routine.

7. A system according to claim 2, wherein the frequency selective processor comprises an amplifier.

8. A system according to claim 1 wherein, if the difference in power is greater than a predetermined level, the controller is configured to modify the at least one operational parameter of the transmitter, without waiting for $T_{wait}$ to be exceeded.

9. A system according to claim 8, wherein the controller is further configured to calculate $T_{wait}$ as a function of difference signals previously generated.

10. A system according to claim 9 wherein the system is configured to respond to any difference signals above the ambient level by either:
   for signals below the predetermined level and above an ambient level, calculating $T_{wait}$; or
   for signals above the predetermined level, responding without relating to $T_{wait}$.

11. A system according to claim 9 wherein the system is configured to respond to any difference signals above an ambient level by either calculating $T_{wait}$ for signals below a predetermined level and above the ambient level, or by modifying the operational parameters of the transmitter to reduce the delta signal.

12. A system according to claim 9 wherein difference signals below a predetermined ambient level are indicative of no significant beam obstructions between the at least one-transmitter and the at least one receiver.

13. A system according to claim 12 wherein if the difference signal falls below an ambient level for a predetermined amount of time, generation of $T_{wait}$ is not significantly based on any previous difference signals.

14. A system according to claim 1, wherein step (iii) is performed should an elapsed time from step (i) exceed $T_{wait}$.

15. A system according to claim 1 wherein the modifying of the at least one operational parameter of the transmitter comprises at least one of:
- modifying the power level of the beam of wireless power;
- terminating lasing completely;
- changing the beam profile of the beam of wireless power emitted;
- blocking the beam of wireless power;
- directing the beam of wireless power to a different location, by using a scanning mirror to steer the beam of wireless power;
- scanning the area around a current scan position to better align the beam of wireless power onto the at least one receiver; and
- recording a scan position of a location that signified an object in the beam of wireless power.

16. A method for safe wireless power supply to at least one receiver, the method comprising:
(a) transmitting power from at least one transmitter to the at least one receiver;
(b) generating a first signal corresponding to a level of power emitted by the at least one transmitter;
(c) generating a second signal corresponding to a level of power received at the at least one receiver;
(d) generating a difference signal, the difference signal being a difference between the second signal and the first signal;
(e) determining a time period $T_{wait}$, being less than a maximal exposure duration relating to a safe exposure duration for a power indicated by the difference signal;
(f) monitoring whether the difference signal has changed by a predetermined amount, and if so, returning to step (e); and
(g) should $T_{wait}$ be exceeded, modifying at least one operational parameter of the at least one transmitter providing the wireless power supply in order to reduce the difference signal.

17. A method according to claim 16 wherein the system responds to difference signals above a predetermined level without using $T_{wait}$ to determine a time period to wait before modifying at least one operational parameter of the at least one transmitter.

18. A method according to claim 16 wherein the $T_{wait}$ is calculated by averaging the difference signal for an amount of time dependent on a level of power indicated by the difference signal, such that difference signals indicating a high level of power have a shorter averaging time than difference signals showing a lesser amount of power.

19. A system for laser power transmission from a transmitter to at least one receiver, the system comprising a hazard prevention system comprising:
- a power monitor measuring the laser power emitted from the transmitter; and
- a power sensor for measuring the laser power at the at least one receiver;
- the hazard prevention system being configured to cause the laser power to be reduced or terminated in response to an increase in the difference between measurements of the power monitor and the power sensor, after a time delay after an occurrence of a difference increase, the time delay, measured in seconds, being:

$$\frac{1.5*10^{-10}*\left(8+e^{\left(\frac{\lambda}{10.857}-115.129255\right)}\right)^4}{(P_{transmitter}-P_{receiver})^4} > \tau_{delay} > \frac{1.5*10^{-12}*\left(8+e^{\left(\frac{\lambda}{10.857}-115.129255\right)}\right)^4}{(P_{transmitter}-P_{receiver})^4}$$

where $P_{transmitter}$ is the laser power emitted from the transmitter measured by the power monitor, measured in Watts; where $P_{receiver}$ is the laser power at the at least one receiver measured at the power sensor, measured in Watts; and where $\lambda$ is a laser wavelength measured in nanometers.

20. A system for safe wireless power supply to at least one receiver, the system comprising:
(a) a transmitter adapted to emit a beam;
(b) a power meter for measuring a power level of the beam emitted;
(c) a detector associated with a receiver, and configured to detect at least a portion of the beam received at the at least one receiver; and
(d) a frequency selective signal processor adapted to:
(i) generate an output signal representing a time period $T_{wait}$, being less than a maximal exposure duration relating to safe exposure durations for a difference in power measured by the power meter and the detector; and
(ii) monitor an elapsed time since a determination of $T_{wait}$ and, should $T_{wait}$ be exceeded, modify at least one operational parameter of the transmitter to reduce the difference in power measured by the power meter and the detector,
wherein the frequency selective processor is configured such that if the output signal is above a predetermined level, the frequency selective processor has an amplification response characteristic such that it modifies an operational parameter of the system independent of $T_{wait}$, such that the amplification response characteristic is shifted towards lower frequencies.

21. The system according to claim 20, wherein the lower frequencies are associated with allowable exposure durations that are significantly longer than the allowable exposure durations of power exposures above the predetermined level.

22. A system for safe wireless power supply to at least one receiver, the system comprising:
(a) a transmitter adapted to emit a beam of wireless power;
(b) a power meter configured to measure a power level of the beam of wireless power emitted;
(c) a detector associated with the at least one receiver, and configured to measure a power of the beam received at the at least one receiver;

(d) at least one controller, adapted to:
  (i) determine an energy limit for accumulated exposure permitted for a power level relating to a difference in power measured by the power meter and the detector;
  (ii) if the difference in power has changed by more than a predetermined amount, dynamically determine a new energy limit; and
  (iii) should the energy limit be exceeded, modify at least one operational parameter of the transmitter to reduce the difference in power.

* * * * *